United States Patent
Jeon et al.

(10) Patent No.: US 10,127,817 B2
(45) Date of Patent: Nov. 13, 2018

(54) VEHICLE AND METHOD FOR CONTROLLING THEREOF

(71) Applicant: HYUNDAI MOTOR COMPANY, Seoul (KR)

(72) Inventors: Dae Seok Jeon, Hwaseong-si (KR); HyeongMin Ko, Ansan-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/446,682

(22) Filed: Mar. 1, 2017

(65) Prior Publication Data
US 2018/0144635 A1    May 24, 2018

(30) Foreign Application Priority Data
Nov. 24, 2016   (KR) .................... 10-2016-0157338

(51) Int. Cl.
   *G08G 1/16*    (2006.01)
   *B60Q 9/00*    (2006.01)
   *G08G 1/00*    (2006.01)

(52) U.S. Cl.
   CPC ............. *G08G 1/166* (2013.01); *B60Q 9/008* (2013.01); *G08G 1/16* (2013.01); *G08G 1/207* (2013.01)

(58) Field of Classification Search
   CPC .......... G08G 1/16; G08G 1/161; G08G 1/162; G08G 1/163; G08G 1/164; G08G 1/166;
   (Continued)

(56) References Cited

U.S. PATENT DOCUMENTS 5,786,787 A *   7/1998   Eriksson ................. G01S 13/66
                                                        342/107
6,859,731 B2 *  2/2005   Takafuji .............. B60R 21/0132
                                                        180/167
(Continued)

FOREIGN PATENT DOCUMENTS

JP          2010083314 A       4/2010
KR      10-2011-0132437 A     12/2011
(Continued)

*Primary Examiner* — Thomas G Black
*Assistant Examiner* — Sara J Lewandroski
(74) *Attorney, Agent, or Firm* — McDermott Will & Emery LLP

(57) ABSTRACT

A vehicle turning in an intersection includes a speed detector configured to detect a driving speed of the vehicle; a sensor configured to determine a cross time between the vehicle and a target vehicle driving in the intersection, and a controller configured to calculate a turning radius of the vehicle in the intersection, based on a minimum turning radius of the intersection, configured to estimate a time to collision between the vehicle turning in the intersection and the target vehicle and a time to collision avoidance allowing the vehicle to pass cross the target vehicle without colliding with the target vehicle, based on at least one of the driving speed of the vehicle and the calculated turning radius, and configured to transmit a warning signal by estimating that the vehicle collides with the target vehicle when the determined cross time is equal to or more than the estimated time to collision and equal to or less than the estimated time to collision avoidance.

20 Claims, 13 Drawing Sheets

(58) Field of Classification Search
CPC .......... G08G 1/167; G08G 1/20; G08G 1/205; G08G 1/207
See application file for complete search history.

(56) References Cited

U.S. PATENT DOCUMENTS

| | | | | |
|---|---|---|---|---|
| 8,558,718 | B2* | 10/2013 | Mochizuki | G08G 1/161 340/436 |
| 8,587,418 | B2* | 11/2013 | Mochizuki | B60Q 9/008 340/435 |
| 9,196,163 | B2 | 11/2015 | Hayasaka et al. | |
| 2005/0143889 | A1* | 6/2005 | Isaji | G08G 1/161 701/70 |
| 2007/0282532 | A1* | 12/2007 | Yamamoto | B60R 21/0134 701/301 |
| 2010/0042323 | A1* | 2/2010 | Harada | B60R 21/0134 701/300 |
| 2012/0068859 | A1* | 3/2012 | Mochizuki | G08G 1/161 340/903 |
| 2013/0018572 | A1* | 1/2013 | Jang | G08G 1/164 701/119 |
| 2014/0149031 | A1* | 5/2014 | Goudy | G08G 1/161 701/300 |
| 2014/0288816 | A1* | 9/2014 | Hayasaka | G08G 1/166 701/301 |
| 2014/0297171 | A1* | 10/2014 | Minemura | G08G 1/166 701/301 |
| 2015/0291158 | A1* | 10/2015 | Okita | B60T 8/17558 701/1 |
| 2016/0039410 | A1* | 2/2016 | Kaminade | B60Q 1/46 701/45 |
| 2016/0052515 | A1* | 2/2016 | Choi | B60W 30/0953 701/1 |
| 2016/0280134 | A1* | 9/2016 | Miura | B60Q 9/008 |
| 2016/0288787 | A1* | 10/2016 | Kraehling | B60W 30/0953 |
| 2016/0335892 | A1* | 11/2016 | Okada | B60T 7/22 |
| 2017/0113665 | A1* | 4/2017 | Mudalige | G08G 1/166 |
| 2017/0132930 | A1* | 5/2017 | Ando | G08G 1/161 |
| 2017/0154531 | A1* | 6/2017 | Funabashi | G01C 21/30 |
| 2017/0166124 | A1* | 6/2017 | Nakagawa | B60Q 9/008 |
| 2017/0169709 | A1* | 6/2017 | Ando | G08G 1/161 |
| 2017/0236413 | A1* | 8/2017 | Takagi | B60R 21/00 701/117 |
| 2017/0350975 | A1* | 12/2017 | Asanuma | G01S 13/60 |
| 2018/0072310 | A1* | 3/2018 | Fung | B60K 28/06 |

FOREIGN PATENT DOCUMENTS

| | | |
|---|---|---|
| KR | 10-2014-0114152 A | 9/2014 |
| KR | 10-2015-0143139 A | 12/2015 |

* cited by examiner

VEHICLE AND METHOD FOR CONTROLLING THEREOF

CROSS-REFERENCE TO RELATED APPLICATION(S)

This application claims the benefit of priority to Korean Patent Application No. 10-2016-0157338, filed on Nov. 24, 2016 in the Korean Intellectual Property Office, the disclosure of which is incorporated herein by reference.

TECHNICAL FIELD

The present disclosure relates to a vehicle and a method for controlling thereof, and more particularly, to a technology for warning a driver by determining a risk of collision with a counter vehicle when a vehicle turns and enters an intersection.

BACKGROUND

A vehicle is configured to transport an object, such as people and goods, to a destination. The vehicle may be capable of moving in a variety of direction by using one and more wheels installed in a body of the vehicle. The vehicle may include three-wheeled, four-wheeled vehicle, a two-wheeled vehicle, such as a motorcycle, construction equipment, a cycle or a train traveling on the rails disposed on the line.

In modern society, the vehicle is the most common means of transportation, and the number of people using it has been increased. Due to the recent development of vehicle technology, driving in a long distance has been easier and vehicle life has been increased. However, traffic congestion has been increasing due to the deterioration of the road traffic in high density areas.

In recent years, a research has been actively carried out for a vehicle equipped with an advanced driver assist system (ADAS) that actively provides information about the vehicle condition, the driver condition, and the surrounding environment in order to reduce the burden on the driver and improve the convenience.

An example of ADAS that is mounted on the vehicle includes a cross collision avoidance (CCA) system. The cross collision avoidance (CCA) system may be operated by determining a risk of collision with a counter vehicle or a crossing vehicle and by performing an emergency braking in a collision situation, when the vehicle drives in the intersection.

The cross collision avoidance (CCA) system plays a role of avoiding the collision by detecting the risk of collision of the vehicle. Further, the need for technology has emerged for warning a driver before the driver enters the intersection, by estimating a risk of collision in advance by determining a condition between the vehicle and a counter vehicle during the vehicle drives.

SUMMARY

An aspect of the present disclosure provides a vehicle and a method for controlling thereof that can warn a driver by determining a risk of collision with a counter vehicle when the vehicle turns and enters an intersection when the vehicle runs.

Additional aspects of the present disclosure will be set forth in part in the description which follows and, in part, will be obvious from the description, or may be learned by practice of the present disclosure.

In accordance with one exemplary embodiment of the present disclosure, a vehicle turning in an intersection includes: a speed detector configured to detect a driving speed of the vehicle; a sensor configured to determine a cross time between the vehicle and a target vehicle driving in the intersection; and a controller configured to calculate a turning radius of the vehicle in the intersection, based on a minimum turning radius of the intersection, configured to estimate a time to collision between the vehicle turning in the intersection and the target vehicle and a time to collision avoidance allowing the vehicle to pass cross the target vehicle without colliding with the target vehicle, based on at least one of the driving speed of the vehicle and the calculated turning radius, and configured to transmit a warning signal by estimating that the vehicle collides with the target vehicle when the determined cross time is equal to or more than the estimated time to collision and equal to or less than the estimated time to collision avoidance.

The controller may estimate a yaw rate in a state in which the vehicle turns in the intersection, based on the driving speed of the vehicle and the calculated turning radius.

The controller may estimate the time to collision and the time to collision avoidance based on the estimated yaw rate.

When the vehicle turns in the intersection, the controller may estimate the time to collision based on a driving distance in which the vehicle drives before crossing the target vehicle in a horizontal direction.

When the vehicle turns in the intersection, the controller may estimate the time to collision avoidance based on a driving distance in which the vehicle passes cross the target vehicle in the horizontal direction.

The controller may estimate the time to collision avoidance based on a driving speed of the target vehicle detected by the sensor.

The sensor may determine a relative speed between the vehicle and the target vehicle by detecting the driving speed of the target vehicle, and determines the cross time based on the determined relative speed and a relative distance between the vehicle and the target vehicle.

The controller may determine the minimum turning radius of the intersection based on at least one of map information, navigation information and lane recognition information of the intersection.

The controller may calculate the turning radius of the vehicle in the intersection based on at least one of the minimum turning radius, information about a lane on which the vehicle drives, and information about a lane on which the target vehicle drives.

The vehicle may further include: a display configured to display whether the vehicle collides with the target vehicle or not, based on the transmitted control signal.

In accordance with another exemplary embodiment of the present disclosure, a method for controlling a vehicle includes: determining a cross time of the vehicle and a target vehicle driving in the intersection; calculating a turning radius of the vehicle in the intersection, based on a minimum turning radius of the intersection; estimating a time to collision between the vehicle turning in the intersection and the target vehicle and a time to collision avoidance allowing the vehicle to pass cross the target vehicle without colliding with the target vehicle, based on at least one of a driving speed of the vehicle and the calculated turning radius; estimating that the vehicle collides with the target vehicle when the determined cross time is equal to or more than the estimated time to collision and equal to or less than the estimated time to collision avoidance; and transmitting a warning signal based on a result of the estimation.

The method for controlling a vehicle may further includes: estimating a yaw rate in a state in which the vehicle turns in the intersection, based on the driving speed of the vehicle and the calculated turning radius.

The estimation of the time to collision and the time to collision avoidance may include estimating the time to collision and the time to collision avoidance based on the estimated yaw rate.

The estimation of the time to collision may include estimating the time to collision based on a driving distance in which the vehicle drives before crossing the target vehicle in a horizontal direction, when the vehicle turns in the intersection.

The estimation of the time to collision avoidance may include estimating the time to collision avoidance based on a driving distance in which the vehicle passes cross the target vehicle in the horizontal direction, when the vehicle turns in the intersection.

The estimation of the time to collision avoidance may include estimating the time to collision avoidance based on a driving speed of the target vehicle.

The determination of the cross time may include determining a relative speed between the target vehicle and the vehicle and determining the cross time based on the determined relative speed and a relative distance between the vehicle and the target vehicle.

The method for controlling a vehicle may further includes: determining the minimum turning radius of the intersection based on at least one of map information, navigation information and lane recognition information of the intersection.

The calculation of the turning radius of the vehicle in the intersection may include calculating the turning radius of the vehicle in the intersection, based on at least one of the minimum turning radius, information about a lane on which the vehicle drives, and information about a lane on which the target vehicle drives.

The method for controlling a vehicle may further includes: displaying whether the vehicle collides with the target vehicle or not, based on the transmitted control signal.

BRIEF DESCRIPTION OF THE DRAWINGS

These and/or other aspects of the disclosure will become apparent and more readily appreciated from the following description of embodiments, taken in conjunction with the accompanying drawings.

DETAILED DESCRIPTION

Figure 1:
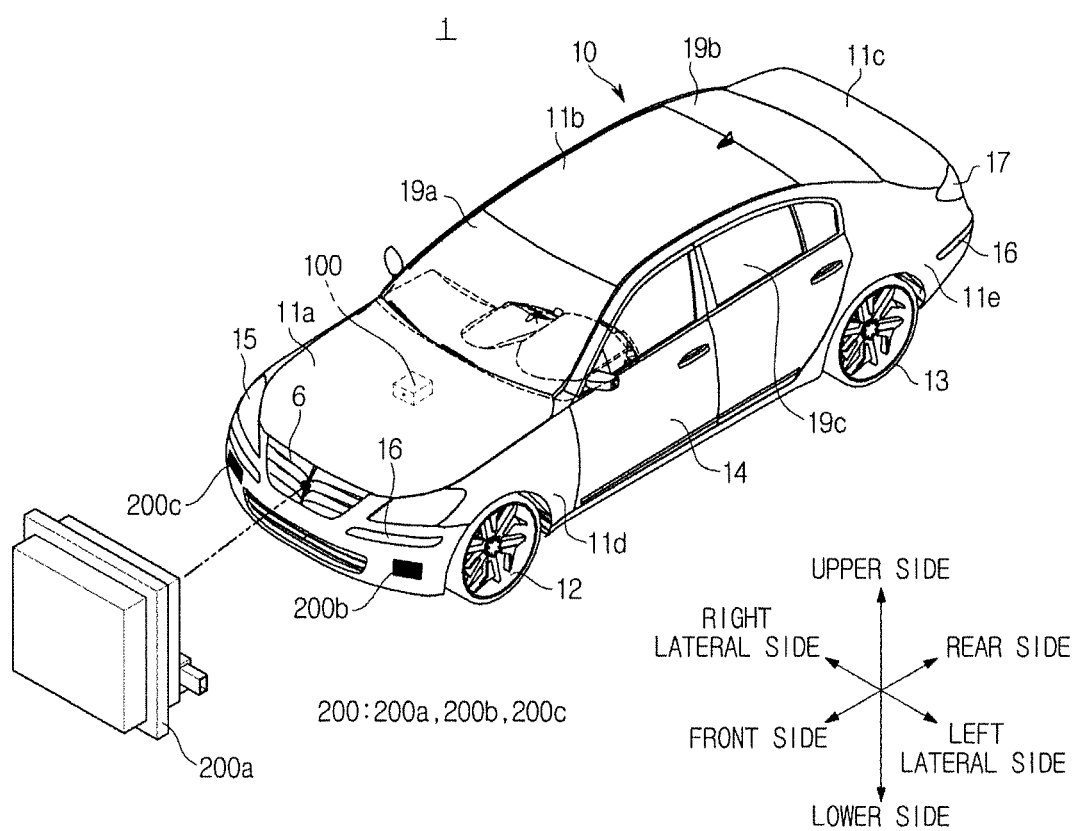
FIG. 1 is a perspective view schematically illustrating an appearance of a vehicle according to an embodiment of the present disclosure.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Reference will now be made in detail to embodiments of the present disclosure, examples of which are illustrated in the accompanying drawings.

Figure 2:
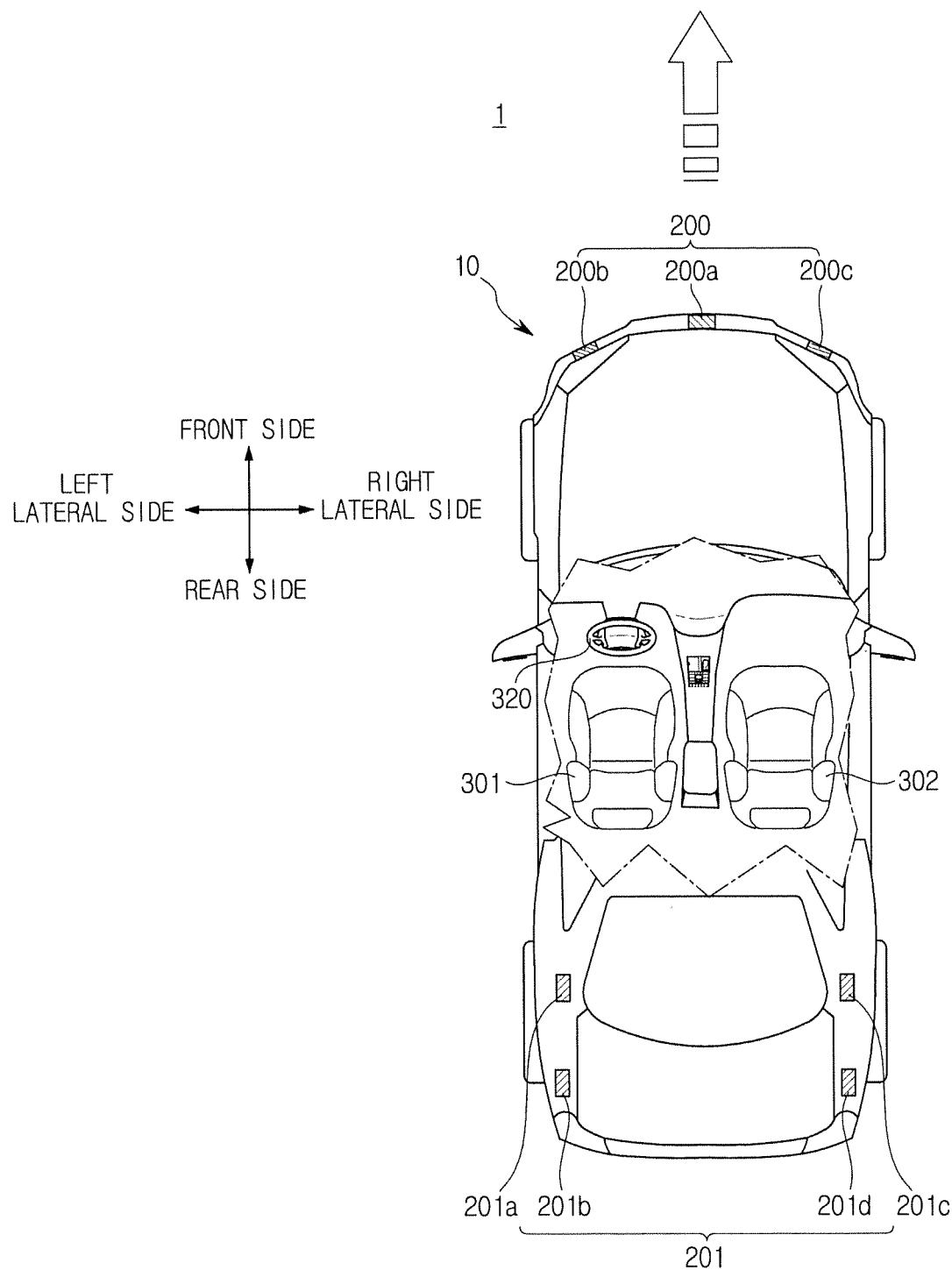
FIG. 2 is a view illustrating the vehicle provided with a sensor according to an embodiment of the present disclosure.
Figure 3:
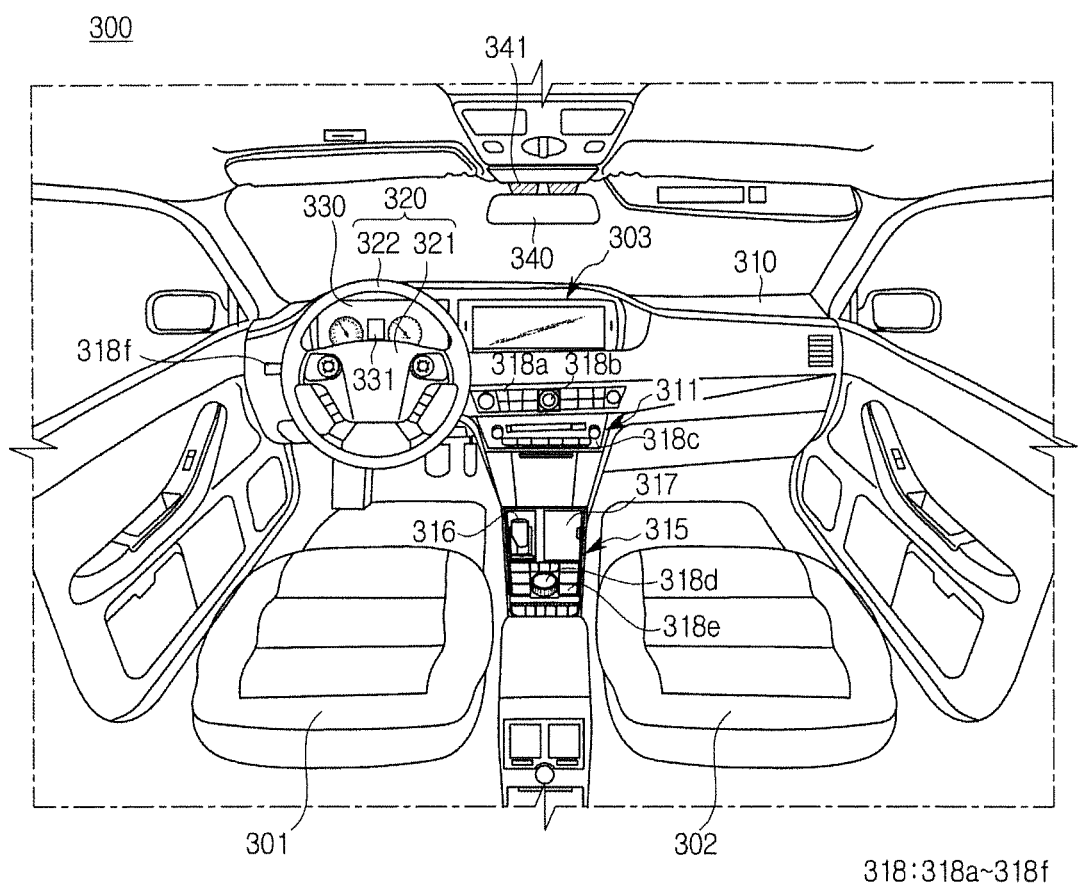
FIG. 3 is a view illustrating an interior structure of the vehicle according to an embodiment of the present disclosure.
Figure 4:
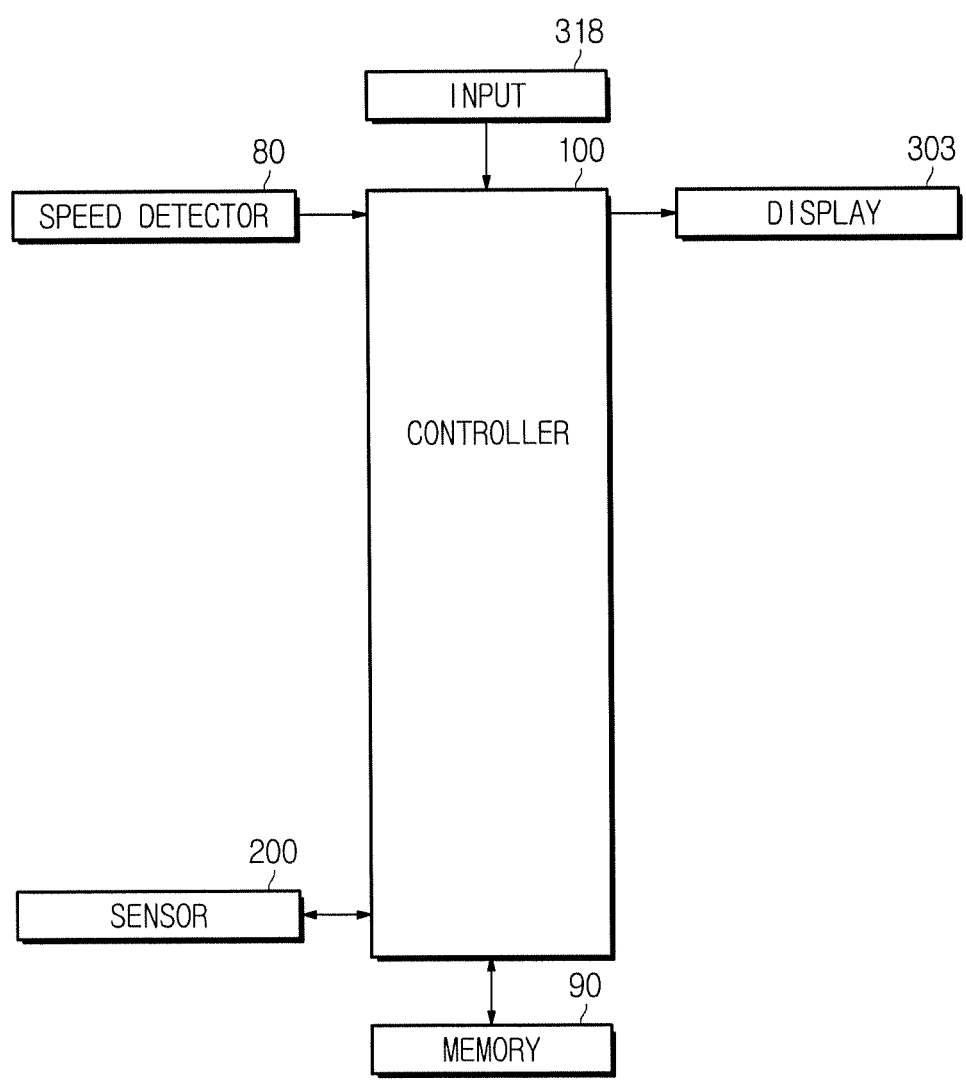
FIG. 4 is a control flow diagram of the vehicle according to an embodiment of the present disclosure.

FIG. 1 is a perspective view schematically illustrating an appearance of a vehicle according to an embodiment of the present disclosure. FIG. 2 is a view illustrating the vehicle provided with a sensor according to an embodiment, FIG. 3 is a view illustrating an interior structure of the vehicle according to an embodiment, and FIG. 4 is a control flow diagram of the vehicle according to an embodiment.

Hereinafter, for convenience of description, as illustrated in FIG. 1, a direction in which a vehicle moves forward may be defined as a front side, and a left direction and a right direction may be defined with respect to the front side. When the front side is a 12 o'clock direction, a 3 o'clock direction or its periphery may be defined as the right direction and a 9 o'clock direction or its periphery may be defined as the left direction. A direction opposite to the front side may be defined as a rear side. A bottom direction with respect to the vehicle may be defined as the lower side and a direction opposite to the lower side may be defined as the upper side. A surface disposed in the front side may be defined as a front surface, a surface disposed in the rear side may be defined as a rear surface, and a surface disposed in the lateral side may be defined as a side surface. A side surface in the left direction may be defined as a left side surface and a side surface in the right direction may be defined as a right side surface.

Referring to FIG. 1, a vehicle 1 may include a body 10 forming an exterior of the vehicle 1, and vehicle wheels 12 and 13 moving the vehicle 1.

The body 10 may include a hood 11a protecting a variety of devices, which are needed to drive the vehicle 1, e.g., an engine, a roof panel 11b forming an inner space, a trunk lid 11c provided with a storage space, a front fender 11d and a quarter panel 11e provided on the side surface of the vehicle 1. In addition, a plurality of doors 15 hinge-coupled to the body 10 may be provided on the side surface of the body 10.

Between the hood 11a and the roof panel 11b, a front window 19a may be configured to provide a view of the front side of the vehicle 1, and between the roof panel 11b and the trunk lid 11c, a rear window 19b may be configured to provide a view of the rear side of the vehicle 1. In addition, on the upper side of the door 15, a side window 19c may be configured to provide a view of the lateral side.

On the front side of the vehicle 1, a headlamp 15 emitting a light in a driving direction of the vehicle 1 may be provided.

On the front and rear side of the vehicle 1, a turn signal lamp 16 indicating a driving direction of the vehicle 1 may be provided.

The vehicle 1 may display a driving direction by flashing the turn signal lamp 16. On the rear side of the vehicle 1, a tail lamp 17 may be provided. The tail lamp 17 may be provided on the rear side of the vehicle 1 to display a gear shifting state and a brake operating state of the vehicle 1.

Referring to FIG. 1, a sensor 200 may be provided in the vehicle 1, wherein the sensor 200 is configured to detect at least one vehicle in front of the vehicle and acquire position information or driving speed information of another vehicle.

According to an embodiment, the sensor 200 may detect another vehicle, which is driving in the intersection, before the vehicle 1 enters the intersection during the vehicle 1 drives, acquire driving speed information of the detected vehicle, and transmit the acquired driving speed information to a controller 100.

The sensor 200 may determine a relative speed between the vehicle 1 and the other vehicle by detecting a driving speed of the other vehicle during driving, and determine a cross time when the vehicle 1 crosses the other vehicle, based on the determined relative speed and a distance between the vehicle 1 and the other vehicle.

The sensor 200 may detect whether an object, e.g., a pedestrian or the other vehicle is placed in the front side or the lateral side, or whether the object is placed in or is approaching from between the front side and the lateral side (hereinafter referred to as "front lateral side").

The sensor 200 may acquire information about the cross time when the vehicle 1 crosses the other vehicle by detecting a driving speed of the other vehicle placed around of the vehicle 1.

As illustrated in FIGS. 1 and 2, the sensor 200 may be installed in a position that is appropriate to recognize an object, e.g. the other vehicle, in the front, lateral or front lateral side. According to an embodiment, the sensor 200 may be installed in all of the front, the left and the right side of the vehicle 1 to recognize an object in all of the front side of the vehicle 1, a direction between the left lateral side and the front side (hereinafter referred to as "left front lateral side") of the vehicle 1 and a direction between the right lateral side and the front side (hereinafter referred to as "right front lateral side") of the vehicle 1.

For example, a first sensor 200a may be installed as a part of a radiator grill 6, e.g., inside of the radiator grill 6, or alternatively the first sensor 200a may be installed in any position of the vehicle 1 as long as detecting another vehicle in the front side. A second sensor 200b may be installed in the left lateral side of the vehicle 1, and a third sensor 200c may be installed in the right lateral side of the vehicle 1.

The sensor 200 may determine whether another vehicle is present or is approaching in the left lateral side, the right lateral side, the front side, the rear side, the left front lateral side, the right front lateral side, the left rear lateral side, or the right rear lateral side, by using electromagnetic waves or laser light. For example, the sensor 200 may emit electromagnetic waves, e.g., microwaves or millimeter waves, pulsed laser light, ultrasonic waves, or infrared light, in the left lateral side, the right lateral side, the front side, the rear side, the left front lateral side, the right front lateral side, the left rear lateral side, or the right rear lateral side, receive pulsed laser light, ultrasonic waves, or infrared light, which are reflected or scatted by an object in the direction, and determine whether the object is placed. In this case, the sensor 200 may further determine a distance to the object or a speed of another vehicle during driving, by using a return time of the radiated electromagnetic waves, pulsed laser light, ultrasonic waves, or infrared light.

According to an embodiment, the sensor 200 may determine the presence of the object by receiving visible light that is reflected or scattered by the object in the left lateral side, the right lateral side, and the front side. As mentioned above, a recognition distance to another vehicle placed in the front or rear side may vary depending on using which one of the electromagnetic waves, the pulsed laser light, the ultrasonic waves, the infrared light or the visible light, and the weather or illumination may affect determining the presence of the object.

By using this, when the vehicle 1 drives in a certain direction along a certain lane, the controller 100 of the vehicle 1 may determine whether another vehicle, which is present in the front side, the left front lateral side and the right front lateral side of the vehicle 1 and drives in another lane, is present or not, and acquire driving information, e.g. a driving speed.

The sensor 200 may be implemented by using a variety of devices, e.g., a radar using millimeter waves or microwaves, a light detection and ranging (LiDAR) using pulsed laser light, a vision sensor using visible light, an infrared sensor using infrared light, or an ultrasonic sensor using ultrasonic waves. The sensor 200 may be implemented by using any one of the radar, the LiDAR, the vision sensor, the infrared sensor, or the ultrasonic sensor or by combining them. When a plurality of sensors 200 are provided in a single vehicle 1, each of the sensor 200 may be implemented by using the same type of sensor or the different type of sensor. The implementation of the sensor 200 is not limited thereto, and the sensor 200 may be implemented by using a variety of devices and a combination thereof which is considered by a designer.

Referring to FIG. 3, in the interior 300 of the vehicle, a driver seat 301, a passenger seat 302, a dashboard 310 and a steering wheel 320, and an instrument panel 330 may be provided.

The dashboard 310 may represent a panel configured to divide the inside of vehicle 1 into the interior of the vehicle 1 and an engine compartment, and in which a variety of components required for the driving is installed. The dashboard 310 may be provided in the front side of the driver seat 301 and the passenger seat 302. The dashboard 310 may include an upper panel, a center fascia 311 and a gear box 315.

In the upper panel of the dashboard 310, a display 303 may be installed. The display 303 may provide a variety of information to a driver or a passenger of the vehicle 1, as an image. For example, the display 303 may visually provide a variety of information, e.g., a map, weather, news, a variety of moving images or still images, and a variety of information related to conditions or operation of the vehicle 1, e.g., information about an air conditioning device. Further, the display 303 may provide a warning according to the risk, to the driver or the passenger. Particularly, when the vehicle 1 changes its lane, the display 303 may provide a warning to the driver, which varies according to the risk. The display 303 may be implemented by using a navigation system that is commonly used.

According to a control method of the vehicle 1 according to an embodiment, the display 303 may display a risk of collision in which the vehicle 1 driven by the driver collides with another vehicle, and display a warning signal configured to prevent the vehicle 1 from being entered into the intersection.

The display 303 may be installed in a housing that is integrally formed with the dashboard 310 to allow a display panel to be exposed to the outside. The display 303 may be installed in the center portion or a lower end of the center fascia 311, an inner surface of a windshield (not shown), or an upper surface of the dashboard 310, wherein the display 303 may be installed in the upper surface of the dashboard 310 by using a supporter (not shown). Alternatively, the display 303 may be installed in a variety of positions by the designer.

In the dashboard 310, a variety of devices, e.g., a processor, a communication module, a GPS reception module, and a storage, may be installed. The processor installed in the vehicle 1 may be configured to control electronics installed in the vehicle 1, and as mentioned above, the processor may be provided to perform functions of the controller 100. The above mentioned devices may be implemented by using a variety of components, e.g., semiconductor chips, switches, integrated circuits, resistors, volatile or non-volatile memory or printed circuit boards.

The center fascia 311 may be provided in the center of the dashboard 310 and may be provided with an input 318a to 318c for inputting a variety of commands related to the vehicle. The input 318a to 318c may be implemented using a physical button, a knob, a touch pad, a touch screen, a stick-type operator or a track ball. The driver may control the various operations of the vehicle 1 by operating the input 318a to 318c.

The gear box 315 may be provided between the driver seat 301 and the passenger seat 302 in the lower end of the center fascia 311. In the gearbox 315, a gear 316, a console 317, and various inputs 318d 318e may be provided. The input 318d to 318e may be implemented using a physical button, a knob, a touch pad, a touch screen, a stick-type operator or a track ball. The console 317 and the input 318d to 318e may be omitted according to an embodiment.

The steering wheel 320 and the instrument panel 330 may be provided in the direction of the driver seat in the dashboard 310.

The steering wheel 320 may be rotatable in a certain direction according to an operation of the driver, and the front vehicle wheel or the rear vehicle wheel of the vehicle 1 may be rotated according to a rotational direction of the steering wheel 320 so that the vehicle 1 is steered. In the steering wheel 320, a spoke 321 connected to a rotational shift and a handle wheel 322 coupled to the spoke 321 may be provided. In the spoke 321, an input means may be installed for inputting a variety of commands, and the input means may be implemented using a physical button, a knob, a touch pad, a touch screen, a stick-type operator, or a track ball. The handle wheel 322 may have a circular shape for the convenience of the driver, but is not limited thereto. A vibrator 201 (201a-201d) may be provided inside at least one of the spoke 321 and the handle wheel 322 and then the at least one of the spoke 321 and the handle wheel 322 may be vibrated with a certain intensity according to an external control. According to an embodiment, the vibrator 201 may be vibrated with various intensities in response to an external control signal, and thus the at least one of the spoke 321 and the handle wheel 322 may be vibrated with various intensities in response to the external control signal. The vehicle 1 may provide a haptic warning to the driver by using the vibrator 201. For example, the at least one of the spoke 321 and the handle wheel 322 may vibrate with an intensity corresponding to a risk, which is determined when the vehicle 1 changes its lane, so as to provide a variety of warnings to the driver. Particularly, as the risk is higher, the at least one of the spoke 321 and the handle wheel 322 may be strongly vibrated so as to provide a high level warning to the driver.

In the rear side of the steering wheel 320, a turn signal indicator input 318f may be provided. A user may input a signal to change a driving direction or a lane via the turn signal indicator input 318f during driving the vehicle 1. When the user inputs a driving direction change signal via the turn signal indicator input 318f, a turn signal indicator indicating a direction, which is intended to be changed, may be flashed in the instrument panel 330, and the controller 100 may receive the direction change signal or the lane change signal of the vehicle 1. In general, when moving the turn signal indicator input 318f upside, the controller 100 may recognize the movement as changing a driving direction into the right side or turning the right side and when moving the turn signal indicator input 318f downside, the controller 100 may recognize the movement as changing a driving direction into the left side or turning the left side.

Even when the vehicle 1 enters the intersection and turns the left or the right, the driver may input a signal for changing a driving direction via the turn signal indicator input 318f during the driving, and the controller 100 may recognize a driving direction and a driving intension of the driver based on the input signal.

The instrument panel 330 may be configured to provide a variety of information related to the vehicle to the driver, wherein the variety of information may include a speed of the vehicle 1, an engine speed, fuel residual amount, a temperature of engine oil or whether the turn signal indicator is flashed or not. The instrument panel 330 may be implemented using an illumination lamp or a scale plate or may be implemented using a display panel according to embodiments. When the instrument panel 330 is implemented using the display panel, the instrument panel 330 may display more various information, e.g., fuel consumption, whether various devices mounted on the vehicle 1 are performed or not, as well as the above mentioned information, for the driver. According to an embodiment, the instrument panel 330 may output a different warning to the driver according to the risk of the vehicle 1. Particularly, the instrument panel 330 may provide a different warning to the driver according to the determined risk when the vehicle 1 changes a lane.

Referring to FIG. 4, according to an embodiment, the vehicle 1 may include a speed detector 80 configured to detect a driving speed of the vehicle 1 driven by the driver, and a memory 90 configured to store data related to the control of the vehicle 1.

The speed detector 80 may detect a driving speed of the vehicle 1 driven by the driver under the control of the controller 100. That is, the speed detector 80 may detect the driving speed of the vehicle 1 by using the rotation speed of the vehicle wheel, and the unit of the driving speed may be expressed as [kph], and a moving distance per unit time (h) may be expressed as (km).

The memory 90 may store a variety of data related to the control of the vehicle 1. Particularly, the memory 90 may store information related to the driving speed, the driving distance and the driving time and driving information about another vehicles detected by the sensor 200.

The memory 90 may store map information, navigation information including the road on which vehicle 1 drives, and lane recognition information recognized by the vehicle 1. That is, a minimum turning radius of a road may be determined by using map information and navigation information about the road when the vehicle 1 enters and turns in the intersection, and an actual turning radius, in a state in which the vehicle 1 is turns the intersection, may be estimated based on the determined minimum turning radius.

In addition, the memory 90 may store data related to an equation and a control algorithm to control the vehicle 1, and the controller 100 may transmit a control signal controlling the vehicle 1 according to the equation and the control algorithm.

The memory 90 may be implemented by using at least one of a non-volatile memory element, e.g., a cache, a read only memory ROM), a programmable ROM (PROM), an erasable programmable ROM (EPROM), an electrically erasable programmable ROM (EEPROM) and a flash memory, a volatile memory element, e.g., a random access memory (RAM), or a storage medium, e.g., a hard disk drive (HDD) and a CD-ROM. The implementation of the memory 90 is not limited thereto. The memory 90 may be a memory that is implemented by the aforementioned processor and a separate memory chip with respect to the controller 100 or the memory 90 may be implemented by a processor and a single chip.

Referring to FIGS. 1 to 4 again, at least one of the controller 100 may be provided in the vehicle 1. The controller 100 may perform an electronic control about each component related to the operation of the vehicle 1.

According to an embodiment, the controller 100 may calculate a turning radius in which the vehicle 1 turns in the intersection when the vehicle 1 enters the intersection and turns the left or the right. That is, the controller 100 may acquire data about a minimum turning radius of the intersection based one at least one of the road map information, the navigation information and the lane recognition information of the road, which are stored in the memory 90, and may estimate an actual turning radius in which the vehicle 1 turns in the intersection, based on the acquired minimum turning radius.

FIGS. 5 to 8 are views schematically illustrating an estimation of a yaw rate by calculating a turning radius when a vehicle turns in an intersection according to an embodiment.

Figure 5:
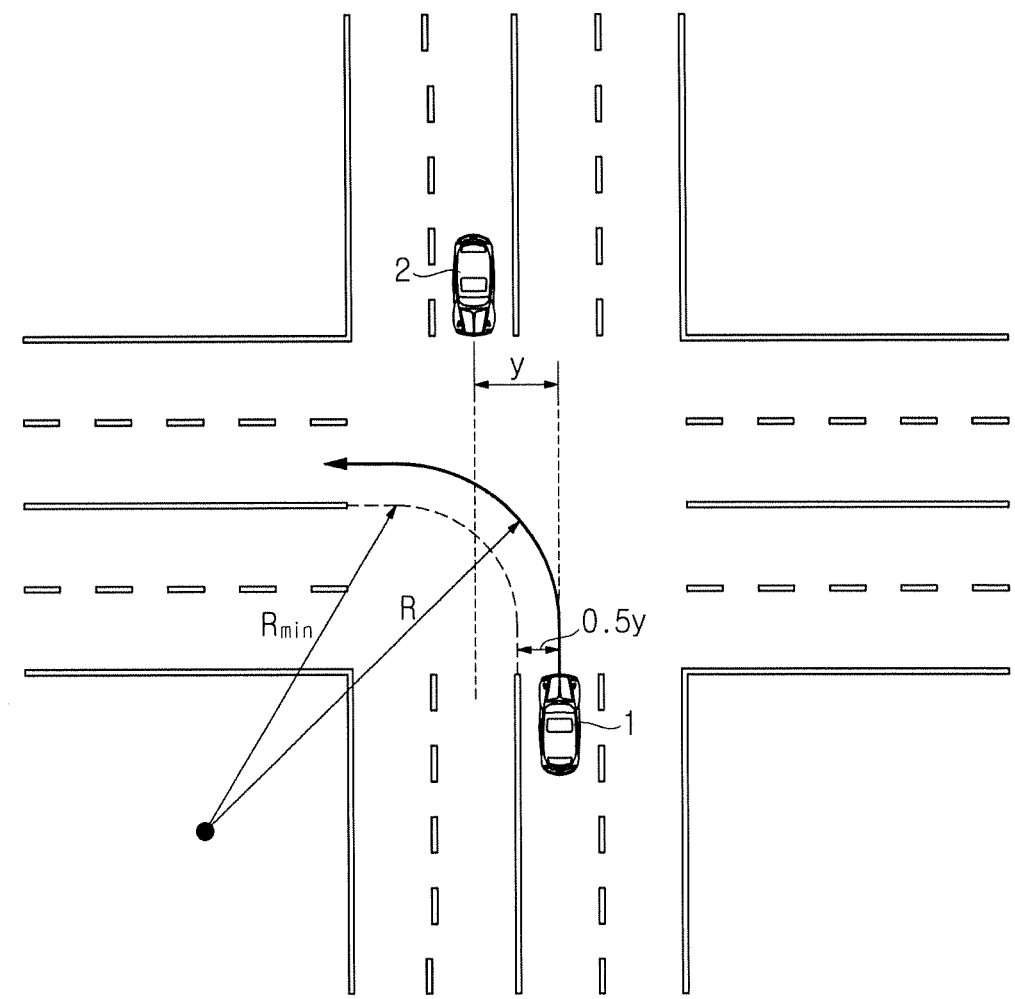
FIGS. 5 to 8 are views schematically illustrating an estimation of a yaw rate by calculating a turning radius when a vehicle turns in an intersection according to an embodiment of the present disclosure.

Referring to FIG. 5, when the vehicle 1 enters and turns in the intersection, the sensor 200 may detect a target vehicle 2 driving in the intersection. In this time, the target vehicle 2 may be another vehicle that is driving in a direction counter to the vehicle 1, as illustrated in FIG. 5.

The sensor 200 may acquire driving information of the target vehicle 2 by detecting the target vehicle 2. That is, the sensor 200 may detect a driving speed of the target vehicle 2 and a distance between the vehicle 1 and the target vehicle 2.

The sensor 200 may detect a distance (y) between the center of the vehicle 1 and the center of the target vehicle 2 and then transmit the distance to the controller 100.

The controller 100 may acquire data about a minimum turning radius ($R_{min}$) of the intersection based one at least one of the road map information, the navigation information and the lane recognition information of the road, which are stored in the memory 90, and may calculate an estimated value of a turning radius (R) in which the vehicle 1 turns in the intersection, based on at least one of the acquired data about the minimum turning radius ($R_{min}$), lane information about a lane on which the vehicle 1 drives and lane information about a lane on which the target vehicle 2 drives.

Although the turning radius (R) in which the vehicle 1 turns in the intersection may be determined by using image information acquired by a camera (not shown) installed in the vehicle 1, a method for estimating the turning radius (R) of the vehicle 1 based on the minimum turning radius ($R_{min}$) of the intersection will be described in a control method of the vehicle 1 according to an embodiment.

As illustrated in FIG. 5, when the vehicle 1 drives in a first lane and the target vehicle 2 drives in a first lane in a counter road, the sensor 200 may detect a driving lane, a driving speed of the target vehicle 2 and a distance between the vehicle 1 and the target vehicle 2.

The data about the minimum turning radius ($R_{min}$) of the intersection may be acquired from the road map information. When both of the vehicle 1 and the target vehicle 2 drive in the first lane, an actual radius (R), in which the vehicle 1 enters and turns in the intersection, may be a value that is acquired by adding a half of the distance (y) between the center of the vehicle 1 and the center of the target vehicle 2, to the minimum turning radius ($R_{min}$).

That is, as for the turning radius (R) in which the vehicle 1 actually turns in the intersection, a relationship in which $R=R_{min}+0.5*y$ may be established. Here, the distance (y) between the center of the vehicle 1 and the center of the target vehicle 2 may be identical to a lane width on which the vehicle 1 drives, and may vary according to which lane the vehicle 1 and the target vehicle 2 drive on. The distance (y) between the center of the vehicle 1 and the center of the target vehicle 2 may be acquired by the sensor 200 and then stored in the memory 90.

The controller 100 may estimate a yaw rate in the state in which the vehicle 1 turns in the intersection, based on the driving speed and the calculated turning radius (R) of the vehicle 1.

The yaw rate ($\gamma$) is "yaw angular velocity", and represents a speed of changing a rotation angle (yaw) around the vertical line passing through the center of the vehicle 1. This yaw rate (γ) may be measured by a measurer (not shown) provided in the vehicle 1 when the vehicle 1 turns in the intersection, but according to the control method of the vehicle 1, when the turning radius (R) in which the vehicle 1 turns in the intersection, is known, it may be possible to estimate a yaw rate (γ) in which the vehicle 1 turns in the intersection.

The yaw rate (γ) may correspond to a value acquired by dividing a driving speed of the vehicle 1 with the turning radius (R) of the vehicle 1. The driving speed of the vehicle 1 may be based on a driving speed of the vehicle 1 before the vehicle 1 enters the intersection, and the controller 100 may estimate a yaw rate (γ) value in the state in which the vehicle 1 enters the intersection while maintaining the corresponding driving speed.

That is, when the driving speed of the vehicle 1 is $V_s$, an estimated value of the yaw rate (γ), in the state in which the vehicle 1 enters and turns with the turning radius (R) in the intersection, may be calculated by using an equation 1, and as illustrated in FIG. 5, since a relationship of $R=R_{min}+0.5*y$ is established, the estimated value of the yaw rate (γ) may be determined by substituting a value obtained by using $R_{min}+0.5*y$, instead of a R value.

$$\gamma = \frac{V_s}{R} \quad \text{[Equation 1]}$$

Figure 6:
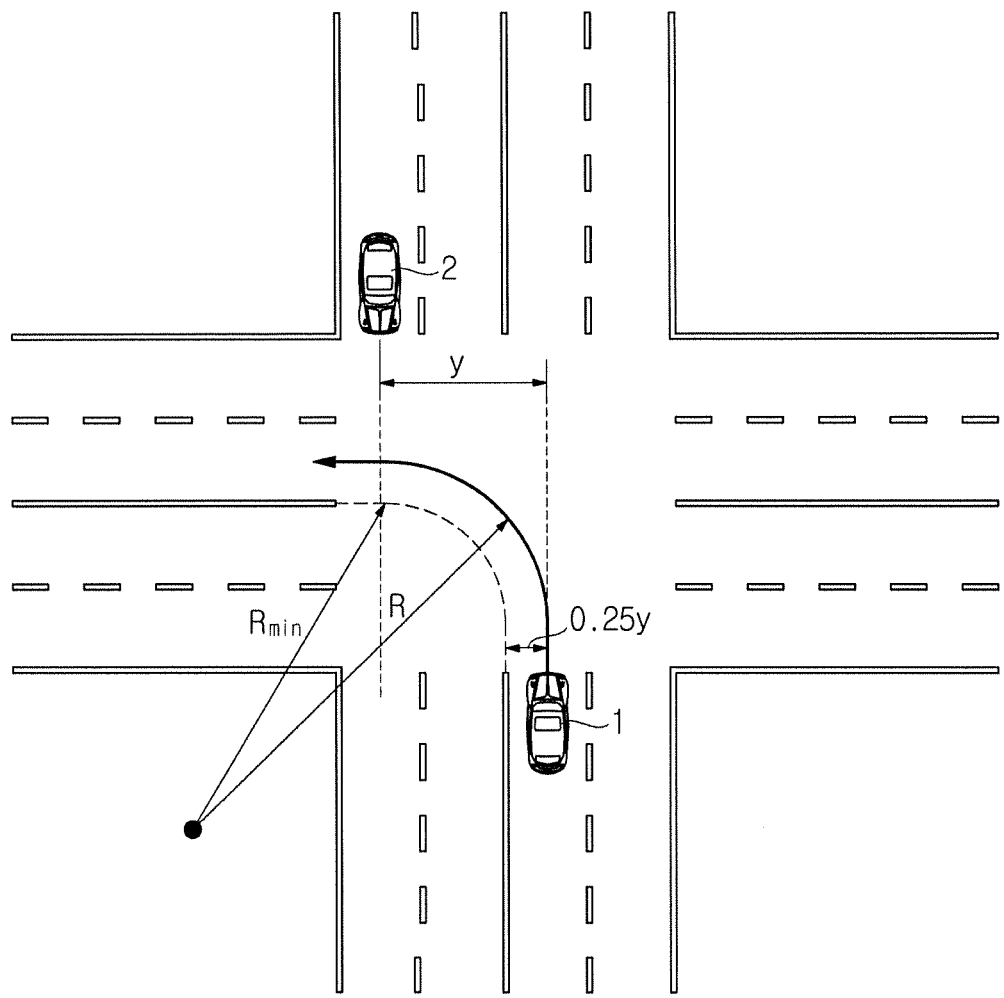

Referring to FIG. 6, when the vehicle 1 enters and turns in the intersection, the sensor 200 may detect the target vehicle 2 driving in the intersection.

As illustrated in FIG. 6, when the vehicle 1 drives in the first lane and the target vehicle 2 drives in the second lane in a counter road, the sensor 200 may detect a driving lane and a driving speed of the target vehicle 2, and a distance between the vehicle 1 and the target vehicle 2. The sensor 200 may detect a distance (y) between the center of the vehicle 1 and the center of the target vehicle 2.

Since the target vehicle 2 drives in the second lane, which is different from what was illustrated in FIG. 5, the distance (y) between the center of the vehicle 1 and the center of the target vehicle 2 may be longer than the distance (y) as illustrated in FIG. 5.

The data about the minimum turning radius ($R_{min}$) of the intersection may be acquired from the road map information. When the vehicle 1 drives in the first lane and the target vehicle 2 drives in the second lane, an actual radius (R), in which the vehicle 1 enters and turns in the intersection, may be a value that is acquired by adding a half of a value, which is acquired by subtracting a lane width from the distance (y) between the center of the vehicle 1 and the center of the target vehicle 2, to the minimum turning radius ($R_{min}$).

That is, as for the turning radius (R) in which the vehicle 1 actually turns in the intersection, a relationship in which $R=R_{min}+0.5*(y-\text{lane width})$ may be established. In this time, the distance (y) between the center of the vehicle 1 and the center of the target vehicle 2 may be identical to two times of the width of the lane on which the vehicle 1 drives, and when it is assumed that the lane width is (a), a relationship of $y=2a$ may be established.

As mentioned above, the distance (y) between the center of the vehicle 1 and the center of the target vehicle 2 may vary according to which lane the vehicle 1 and the target vehicle 2 drive on. The distance (y) between the center of the vehicle 1 and the center of the target vehicle 2 may be acquired by the sensor 200 and then stored in the memory 90.

The controller 100 may estimate the yaw rate (γ) in which the vehicle 1 turns in the intersection, based on the driving speed and the calculated turning radius (R) of the vehicle 1.

The yaw rate (γ) may correspond to a value acquired by dividing the driving speed of the vehicle 1 with the turning radius (R) of the vehicle 1. The driving speed of the vehicle 1 as illustrated in FIG. 6 may be based on a driving speed of the vehicle 1 before the vehicle 1 enters the intersection, and the controller 100 may estimate a yaw rate (γ) value in the state in which the vehicle 1 enters the intersection while maintaining the corresponding driving speed.

That is, when the driving speed of the vehicle 1 is $V_s$, an estimated value of the yaw rate (γ), in the state in which the vehicle 1 enters and turns with the turning radius (R) in the intersection, may be calculated by using an equation 1, and as illustrated in FIG. 6, since a relationship of $R=R_{min}+0.25*y$ is established based on the equation of $R=R_{min}+0.5*(y-\text{lane width})$, the estimated value of the yaw rate (γ) may be determined by substituting a value acquired by using a value acquired by $R_{min}+0.25*y$, instead of a R value.

When comparing FIG. 5 with FIG. 6, the turning radius (R) in which the vehicle 1 enters and turns in the intersection, may be changed according to which lane the target vehicle 2 drives on, although the vehicle 1 drives in the same lane.

Figure 7:
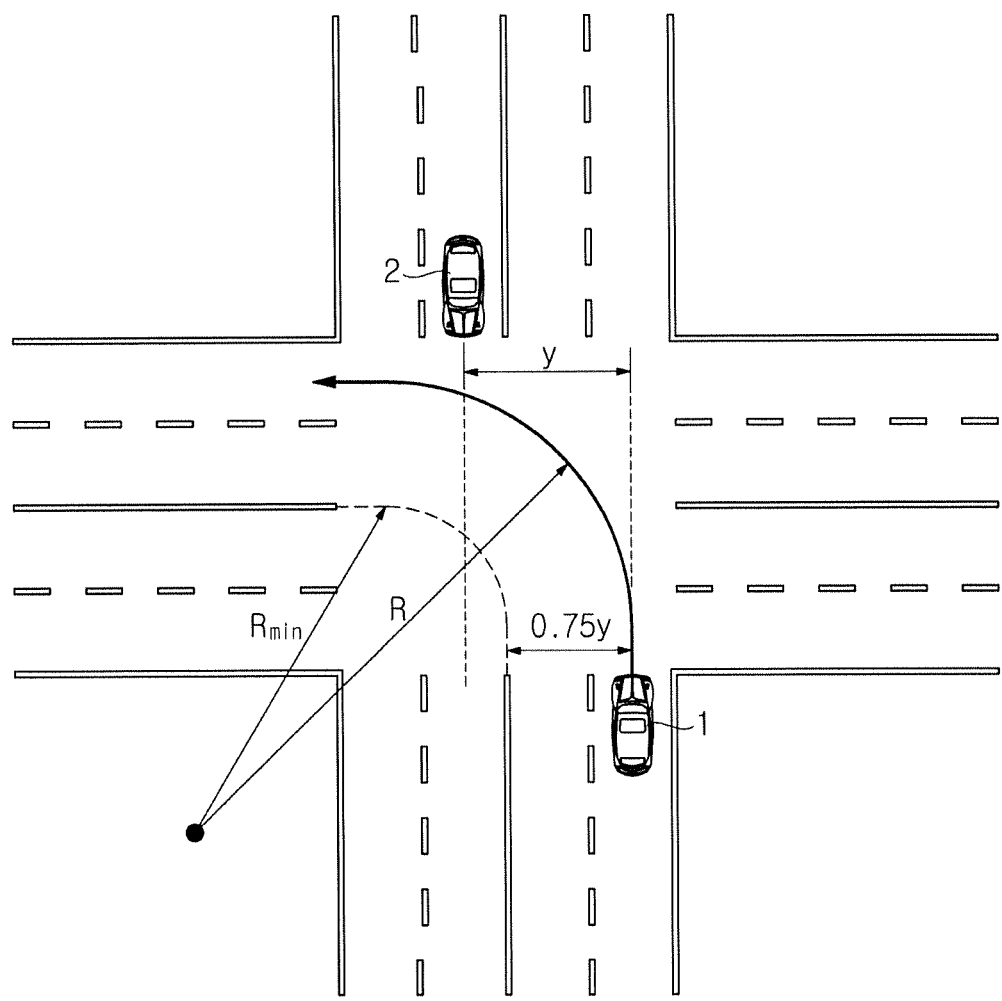

Referring to FIG. 7, when the vehicle 1 enters and turns in the intersection, the sensor 200 may detect the target vehicle 2 driving in the intersection.

As illustrated in FIG. 7, when the vehicle 1 drives in the second lane and the target vehicle 2 drives in the first lane in a counter road, the sensor 200 may detect a driving lane, a driving speed of the target vehicle 2 and a distance between the vehicle 1 and the target vehicle 2. The sensor 200 may detect a distance (y) between the center of the vehicle 1 and the center of the target vehicle 2.

The data about the minimum turning radius ($R_{min}$) of the intersection may be acquired from the road map information. When the vehicle 1 drives in the second lane and the target vehicle 2 drive in the first lane, an actual radius (R), in which the vehicle 1 enters and turns in the intersection, may be a value that is acquired by adding a half of a value, which is acquired by subtracting a lane width from the distance (y) between the center of the vehicle 1 and the center of the target vehicle 2, to the lane width and the minimum turning radius ($R_{min}$).

That is, as for the turning radius (R) in which the vehicle 1 actually turns in the intersection, a relationship in which $R=R_{min}+\text{lane width}+0.5*(y-\text{lane width})$ may be established. In this time, the distance (y) between the center of the vehicle 1 and the center of the target vehicle 2 may be identical to two times of the width of the lane on which the vehicle 1 drives, and when it is assumed that the lane width is (a), a relationship of $y=2a$ may be established.

As mentioned above, the distance (y) between the center of the vehicle 1 and the center of the target vehicle 2 may vary according to which lane the vehicle 1 and the target vehicle 2 drive on. The distance (y) between the center of the vehicle 1 and the center of the target vehicle 2 may be acquired by the sensor 200 and then stored in the memory 90.

The controller 100 may estimate the yaw rate (γ) in which the vehicle 1 turns in the intersection, based on the driving speed and the calculated turning radius (R) of the vehicle 1.

The yaw rate (γ) may correspond to a value acquired by dividing the driving speed of the vehicle 1 with the turning radius (R) of the vehicle 1. The driving speed of the vehicle 1 as illustrated in FIG. 7 may be based on a driving speed of the vehicle 1 before the vehicle 1 enters the intersection, and the controller 100 may estimate a yaw rate (γ) value in the state in which the vehicle 1 enters the intersection while maintaining the corresponding driving speed.

That is, when the driving speed of the vehicle 1 is $V_s$, an estimated value of the yaw rate (γ), in the state in which the vehicle 1 enters and turns with the turning radius (R) in the intersection, may be calculated by using an equation 1, and as illustrated in FIG. 7, since a relationship of $R=R_{min}+0.75*y$ is established based on the equation of $R=R_{min}+$lane width$+0.5*$(y-lane width), the estimated value of the yaw rate (γ) may be determined by substituting a value obtained by using a value acquired by $R_{min}+0.75*y$, instead of a R value.

Figure 8:
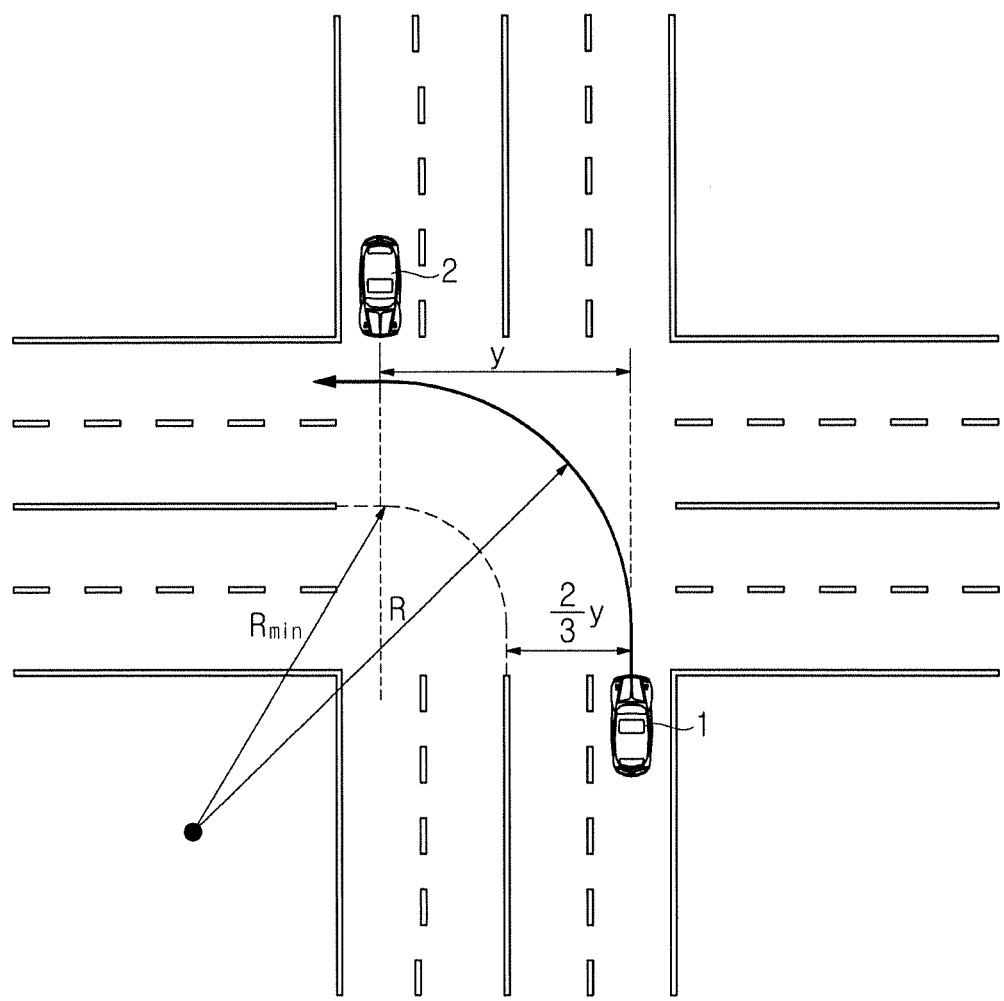

Referring to FIG. 8, when the vehicle 1 enters and turns in the intersection, the sensor 200 may detect the target vehicle 2 driving in the intersection.

As illustrated in FIG. 8, when the vehicle 1 drives in the second lane and the target vehicle 2 drives in the second lane in a counter road, the sensor 200 may detect a driving lane and a driving speed of the target vehicle 2, and a distance between the vehicle 1 and the target vehicle 2. The sensor 200 may detect a distance (y) between the center of the vehicle 1 and the center of the target vehicle 2.

Since the target vehicle 2 drives in the second lane, which is different from what was illustrated in FIG. 7, the distance (y) between the center of the vehicle 1 and the center of the target vehicle 2 may be longer than the distance (y) as illustrated in FIG. 7.

The data about the minimum turning radius ($R_{min}$) of the intersection may be acquired from the road map information. When the vehicle 1 drives in the second lane and the target vehicle 2 drive in the second lane, an actual radius (R), in which the vehicle 1 enters and turns in the intersection, may be a value that is acquired by adding a half of a value, which is acquired by subtracting a lane width from the distance (y) between the center of the vehicle 1 and the center of the target vehicle 2, to the lane width and the minimum turning radius ($R_{min}$).

That is, as for the turning radius (R) in which the vehicle 1 actually turns in the intersection, a relationship in which $R=R_{min}+$lane width$+0.5*$(y-lane width) may be established. Here, the distance (y) between the center of the vehicle 1 and the center of the target vehicle 2 may be identical to three times of the width of the lane on which the vehicle 1 drives, and when it is assumed that the lane width is (a), a relationship of y=3a may be established.

As mentioned above, the distance (y) between the center of the vehicle 1 and the center of the target vehicle 2 may vary according to which lane the vehicle 1 and the target vehicle 2 drive on. The distance (y) between the center of the vehicle 1 and the center of the target vehicle 2 may be acquired by the sensor 200 and then stored in the memory 90.

The controller 100 may estimate the yaw rate (γ) in which the vehicle 1 turns in the intersection, based on the driving speed and the calculated turning radius (R) of the vehicle 1.

The yaw rate (γ) may correspond to a value acquired by dividing the driving speed of the vehicle 1 with the turning radius (R) of the vehicle 1. The driving speed of the vehicle 1 as illustrated in FIG. 8 may be based on a driving speed of the vehicle 1 before the vehicle 1 enters the intersection, and the controller 100 may estimate a yaw rate (γ) value in the state in which the vehicle 1 enters the intersection while maintaining the corresponding driving speed.

That is, when the driving speed of the vehicle 1 is $V_s$, an estimated value of the yaw rate (γ), in the state in which the vehicle 1 enters and turns with the turning radius (R) in the intersection, may be calculated by using an equation 1, and as illustrated in FIG. 8, since a relationship of $R=R_{min}+(2/3)*y$ is established based on the equation of $R=R_{min}+0.5*$(y-lane width), the estimated value of the yaw rate (γ) may be determined by substituting a value obtained by using a value acquired by $R_{min}+(2/3)*y$, instead of a R value.

When comparing FIG. 7 with FIG. 8, the turning radius (R) in which the vehicle 1 enters and turns in the intersection, may be changed according to which lane the target vehicle 2 drives on, although the vehicle 1 drives in the same lane.

Accordingly, the controller 100 may estimate the yaw rate (γ) in which the vehicle 1 turns with the turning radius (R) of the vehicle 1, which is based on the minimum turning radius ($R_{min}$) of the intersection, in the intersection.

Figure 9:
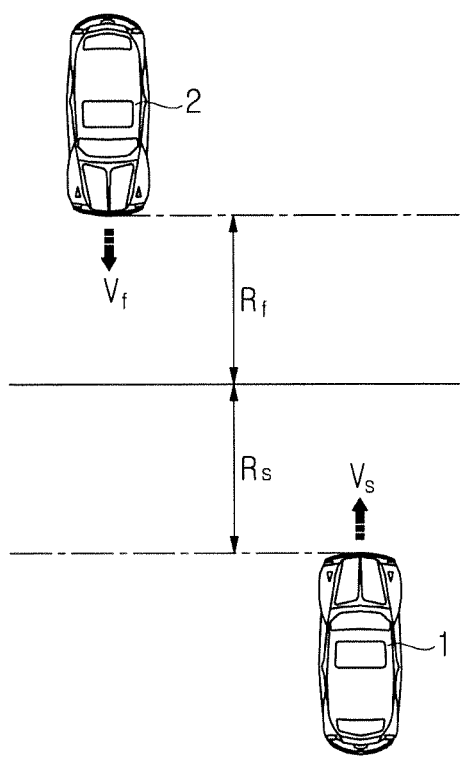
FIG. 9 is a view schematically illustrating a determination of a cross time in which the vehicle and the target vehicle are crossed according to an embodiment of the present disclosure.

FIG. 9 is a view schematically illustrating a determination of a cross time in which the vehicle and the target vehicle are crossed according to an embodiment.

As illustrated in FIG. 9, when it is assumed that the vehicle 1 drives in a direction facing the target vehicle 2 and the target vehicle 2 drives in a direction facing the target vehicle 2, the vehicle 1 and the target vehicle 2 may meet to each other in a position, which is apart from both of the vehicle 1 and the target vehicle 2 with a certain distance.

When it is assumed that a point where the vehicle 1 and the target vehicle 2 are crossed is a cross point (C), a speed of the vehicle 1 is $V_s$, a speed of the target vehicle 2 is $V_f$, a distance from the vehicle 1 to the cross point (C) is $R_s$, and a distance from the target vehicle 2 to the cross point (C) is $R_f$, the vehicle 1 may arrive the cross point (C) after moving the distance of $R_s$ at the speed of $V_s$ with a certain period of time, and the target vehicle 2 may arrive the cross point (C) after moving the distance of $R_f$ at the speed of $V_f$ with a certain period of time.

That is, a point of time when the vehicle 1 and the target vehicle 2 meet with each other at the cross point (C) may correspond to a cross time ($t_1$), and the cross time ($t_1$) may be acquired by dividing a relative distance value of the vehicle 1 and the target vehicle 2 with a relative speed value.

FIG. 9 illustrates that the vehicle 1 and the vehicle 1 meet with each other at the cross point (C) after moving in a vertical direction, and thus, the cross time ($t_1$) in which the vehicle 1 and the vehicle 1 meet with each other at the cross point (C) may correspond to time information with respect to the vertical direction of the vehicle 1.

As mentioned above, the vehicle 1 may cross the target vehicle 2 when the vehicle 1 turns in the intersection, and in this case, the cross time may be approximated as the cross time ($t_1$) with respect to the vertical direction of the vehicle 1, as illustrated in FIG. 9.

That is, when the vehicle 1 and the vehicle 1 meet with each other after moving in a different direction, it may be assumed that there is not a sufficient difference between a driving time in which the vehicle 1 directly drives to the cross point (C), as illustrated in FIG. 9, and a driving time in which the vehicle 1 turns to the cross point (C), as mentioned above.

Therefore, when determining a risk of collision between the vehicle 1 and the target vehicle 2, the determination may be performed by setting the cross time ($t_1$) in which the vehicle 1 drives in the vertical direction and then cross the vehicle 1, as a time in which the vehicle 1 drives in a horizontal direction.

The cross time ($t_1$) may be acquired by the sensor 200. That is, the sensor 200 may detect the target vehicle 2 during the vehicle 1 drives, and determine a relative speed between the vehicle 1 and the target vehicle 2 by detecting the driving speed of the target vehicle 2. The sensor 200 may determine the cross time ($t_1$) in which the vehicle 1 crosses the target vehicle 2, based on the determined relative speed and the distance between the vehicle 1 and the target vehicle 2.

Figure 10:
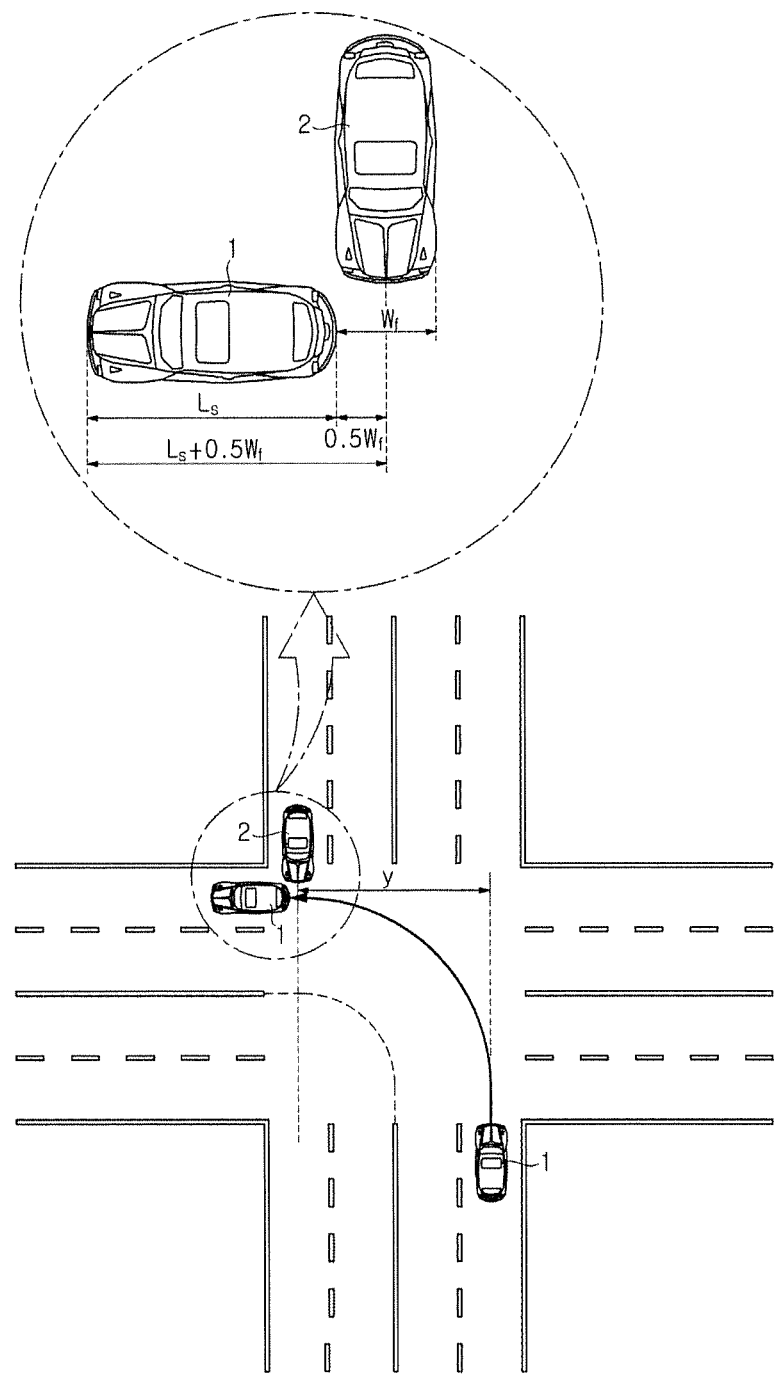
FIG. 10 is a view schematically illustrating a determination of a time to collision avoidance of the vehicle and the target vehicle based on a collision avoidance distance according to an embodiment of the present disclosure.

FIG. 10 is a view schematically illustrating a determination of a time to collision avoidance of the vehicle and the target vehicle based on a collision avoidance distance according to an embodiment.

Referring to FIG. 10, during the vehicle 1 drives, the vehicle 1 may cross the target vehicle 2 after entering and turning in the intersection. In this time, the vehicle 1 and the target vehicle 2 may be or may not collide with each other according to a driving speed of the vehicle 1 and the target vehicle 2, and a relative distance between the vehicle 1 and the target vehicle 2.

FIG. 10 illustrates that the vehicle 1 and the target vehicle cross without a collision in the horizontal direction (Y direction), and in this case, the controller 100 may estimate a time to collision avoidance (TTCAY) in which the vehicle 1 and the target vehicle 2 avoid the collision.

In the state in which the vehicle 1 drives, the controller 100 may estimate a time in which the vehicle 1 passes the target vehicle 2 when the vehicle 1 turns in the intersection, based on a current driving speed of the vehicle 1 before entering the intersection, a driving speed of the target vehicle 2, and a driving distance of the vehicle 1, and here, data about a driving distance in the horizontal direction, in which the vehicle 1 and the target vehicle 2 drive without the collision, may be required.

Referring to FIG. 10, when a length of the vehicle 1 is $L_s$, a width of the target vehicle 2 acquired by the sensor 200 is $W_f$, and a distance between the center of the vehicle 1 and the center of the target vehicle 2 is y, a collision avoidance distance ($y_{ca}$) may be calculated by using equation 2, wherein the collision avoidance distance ($y_{ca}$) represents a driving distance of the vehicle 1 in the horizontal direction when the vehicle 1 passes the target vehicle 2.

$$y_{ca} = y + L_S + 0.5 \cdot W_f \qquad \text{Equation 2}$$

When the collision avoidance distance ($y_{ca}$) is determined, the controller 100 may estimate the time to collision avoidance (TTCAY) in which the vehicle 1 drives the collision avoidance distance ($y_{ca}$) and avoids a collision with the target vehicle 2.

That is, based on the above calculated collision avoidance distance ($y_{ca}$) and the driving speed ($V_f$) of the target vehicle 2, the controller 100 may estimate the time to collision avoidance (TTCAY) by using equation 3.

$$\sqrt{\frac{2y_{ca}}{v_s \gamma}} + \frac{v_f}{2\mu g} \qquad \text{Equation 3}$$

Here, $v_s$ is a driving speed of the vehicle 1, and $\gamma$ is an estimated yaw rate when the vehicle 1 turns in the intersection. $\mu$ is friction coefficient, and g is the acceleration of gravity.

The time to collision avoidance (TTCAY) may include a time in which the vehicle 1 drives the collision avoidance distance ($y_{ca}$) without colliding with the target vehicle 2, and a time to brake for responding the collision by operating a brake when the target vehicle 2 detects driving of the vehicle 1 and then there is a risk of collision. That is, the time to brake in which a driver of the target vehicle 2 responds to avoid the collision may be expressed by equation 4.

$$\frac{v_f}{2\mu g} \qquad \text{Equation 4}$$

That is, the controller 100 may calculate the collision avoidance distance ($y_{ca}$) in which the vehicle 1 enters and turns in the intersection, and the controller 100 may estimate the time to collision avoidance Y (TTCAY) for avoiding the collision with the target vehicle 2, based on the calculated collision avoidance distance ($y_{ca}$).

Figure 11:
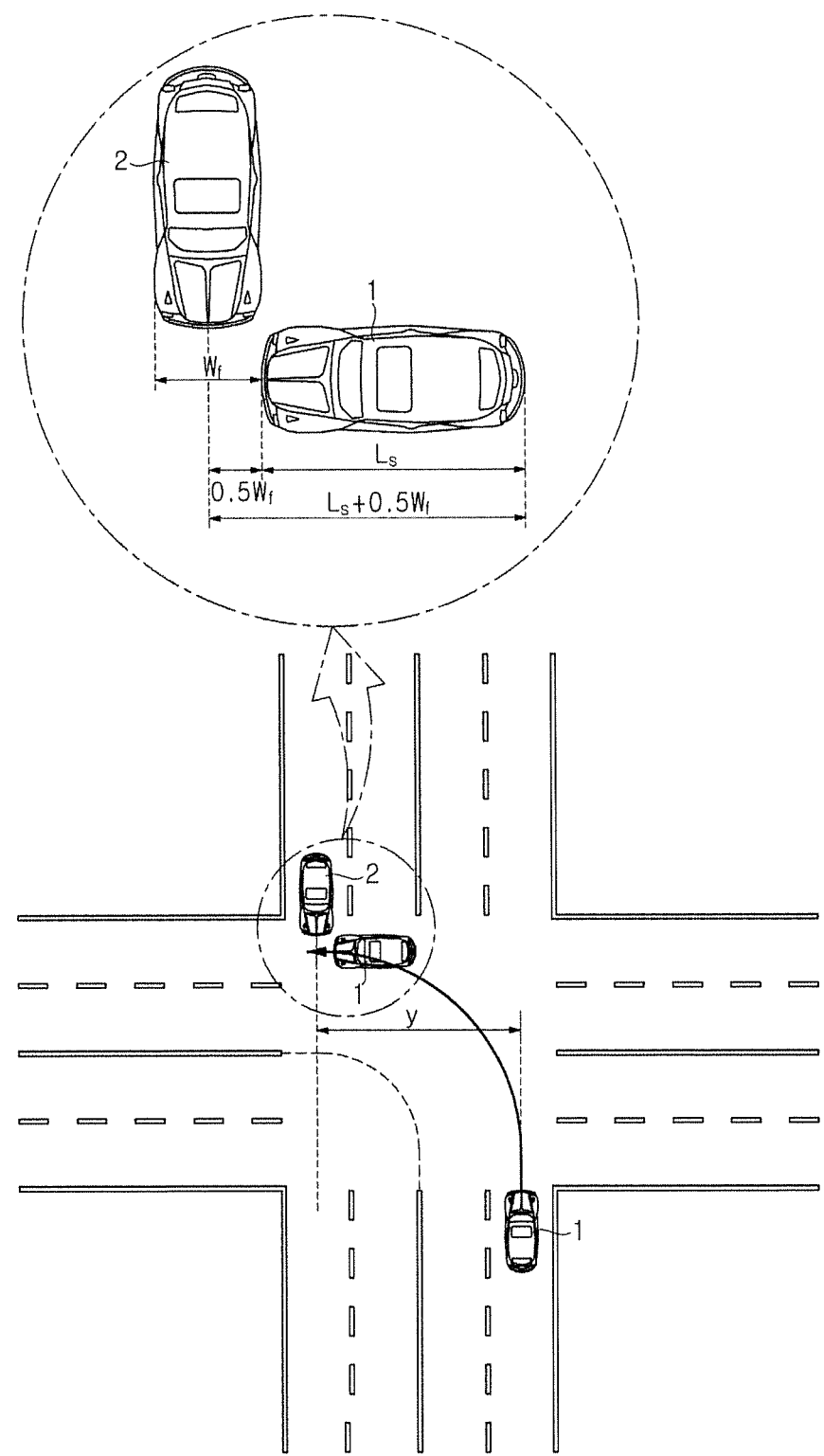
FIG. 11 is a view schematically illustrating an estimation of a time to collision between the vehicle and the target vehicle based on a collision distance according to an embodiment of the present disclosure.

FIG. 11 is a view schematically illustrating an estimation of a time to collision between the vehicle and the target vehicle based on a collision distance according to an embodiment.

Referring to FIG. 11, during the vehicle 1 drives, the vehicle 1 may cross the target vehicle 2 after entering and turning in the intersection.

FIG. 11 illustrates that the vehicle 1 is placed in a position just before passing cross the target vehicle 2 in the horizontal direction (Y direction), and the vehicle 1 may collide with the target vehicle 2 after a certain period of time that is taken for the vehicle 1 to drive until the illustrated position.

The controller 100 may estimate an expected collision time (time to collision Y; TTCY) in which the vehicle 1 and the target vehicle 2 may collide with each other.

In the state in which the vehicle 1 drives, the controller 100 may estimate a time until just before the vehicle 1 passes the target vehicle 2 when the vehicle 1 turns in the intersection, based on a current driving speed of the vehicle 1 before entering the intersection, a driving speed of the target vehicle 2, and a driving distance of the vehicle 1, and in this time, data about a driving distance until just before the vehicle 1 passes the target vehicle 2 in the horizontal direction may be required.

Referring to FIG. 11, when the length of the vehicle 1 is $L_S$, the width of the target vehicle 2 acquired by the sensor 200 is $W_f$, and the distance between the center of the vehicle 1 and the center of the target vehicle 2 is y, an expected collision distance (collision y;$y_c$) may be calculated by using equation 5, wherein the collision distance ($y_c$) represents a driving distance until just before the vehicle 1 passes the target vehicle 2 in the horizontal direction.

$$y_c = y - 0.5 w_f \qquad \text{Equation 5}$$

When the collision distance ($y_c$) is determined, the controller 100 may estimate the time to collision (TTCY) that is taken for the vehicle 1 to drive the collision distance ($y_c$) until just before colliding with the target vehicle 2.

That is, based on the above calculated collision distance ($y_c$), the driving speed ($V_s$) of the vehicle 1, and a yaw rate ($\gamma$) in the state in which the vehicle 1 turns in the intersection, the controller 100 may estimate the time to collision (TTCY) by using equation 6.

$$\sqrt{\frac{2y_c}{v_s \gamma}} \qquad \text{Equation 6}$$

Therefore, when the vehicle 1 enters and turns in the intersection, the controller 100 may estimate the time to collision avoidance (TTCAY) and the time to collision (TTCY) based on the collision avoidance distance ($y_{ca}$) and the collision distance ($y_e$).

The controller 100 may compare the estimated time to collision avoidance (TTCAY) and the estimated time to collision (TTCY) with the cross time ($t_1$) and estimate that the vehicle 1 will collide with the target vehicle 2 when the cross time ($t_1$) is equal to or more than the estimated time to collision (TTCY) and equal to or less than the estimated time to collision avoidance (TTCAY).

For example, when the estimated time to collision (TTCY) is three seconds and the estimated time to collision avoidance (TTCAY) is five seconds, a time that is taken for the vehicle 1 to reach a position just before colliding with the target vehicle 2 may be three seconds and a time that is taken for the vehicle 1 to pass cross the target vehicle 2 without colliding with the target vehicle 2 may be five seconds.

Therefore, when the cross time ($t_1$), at which the vehicle 1 crosses the target vehicle 2 at the cross point (C), i.e., at which a relative distance between the vehicle 1 and the target vehicle 2 is 0 (zero), is from three seconds to five seconds, the vehicle 1 may collide with the target vehicle 2.

The controller 100 may determine whether the cross time ($t_1$) is in a range of the time to collision avoidance (TTCAY) and the time to collision (TTCY), and when the cross time (t1) is equal to or more than the estimated time to collision (TTCY) and equal to or less than the estimated time to collision avoidance (TTCAY), the controller 100 may estimate that the vehicle 1 will collide with the target vehicle 2, or otherwise, the controller 100 may estimate that the vehicle 1 will not collide with the target vehicle 2.

As a result, when it is estimated that the vehicle 1 will collide with the target vehicle 2 when the vehicle 1 enters and turns in the intersection, the controller 100 may transmit a control signal warning a driver. The driver may recognize a risk of collision with the target vehicle 2 in the state in which the vehicle 1 enters and turns in the intersection, by a warning text displayed on the display 303 or the instrument panel 330 of the vehicle 1.

Figure 12:
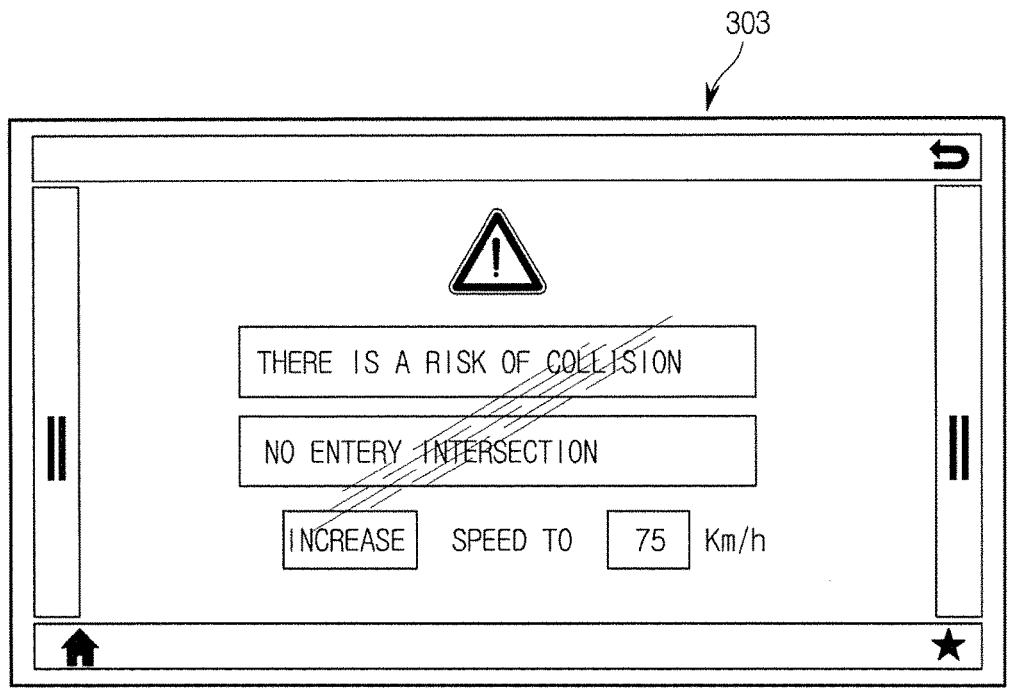
FIG. 12 is a view illustrating a risk of collision between the vehicle and the target vehicle displayed on the display according to an embodiment of the present disclosure.

FIG. 12 is a view illustrating a risk of collision between the vehicle and the target vehicle displayed on the display according to an embodiment of the present disclosure.

As mentioned above, the controller 100 may transmit a control signal warning a user by determining a risk of collision with the target vehicle 2 when the vehicle 1 turns in the intersection, and the display 303 may display a text indicating that the vehicle 1 may collide with the target vehicle 2, based on the control signal transmitted by the controller 100, as illustrated in FIG. 12.

A text, which warns a driver of the vehicle 1 so that the vehicle 1 does not enter the intersection, based on the presence of the collision between the vehicle 1 and the target vehicle 2 and the risk of collision between the vehicle 1 and the target vehicle 2, and a text, which is about how the driving speed should be changed so as not to collide with the target vehicle 2 when the vehicle 1 enters and turns at a current speed in the intersection, may be displayed on the display 303. Further, the display 303 may display a text warning the driver based on the risk of collision between the vehicle 1 and the target vehicle 2.

Although not shown in the drawings, a screen displayed on the display 303 may be displayed in the same manner as the instrument panel 330. The controller 100 may warn a driver through the screen of the display 303 by transmitting the control signal warning the risk of collision between the vehicle 1 and the target vehicle 2, or alternatively the controller 100 may inform a driver of the risk of collision by outputting a warning sound.

Figure 13:
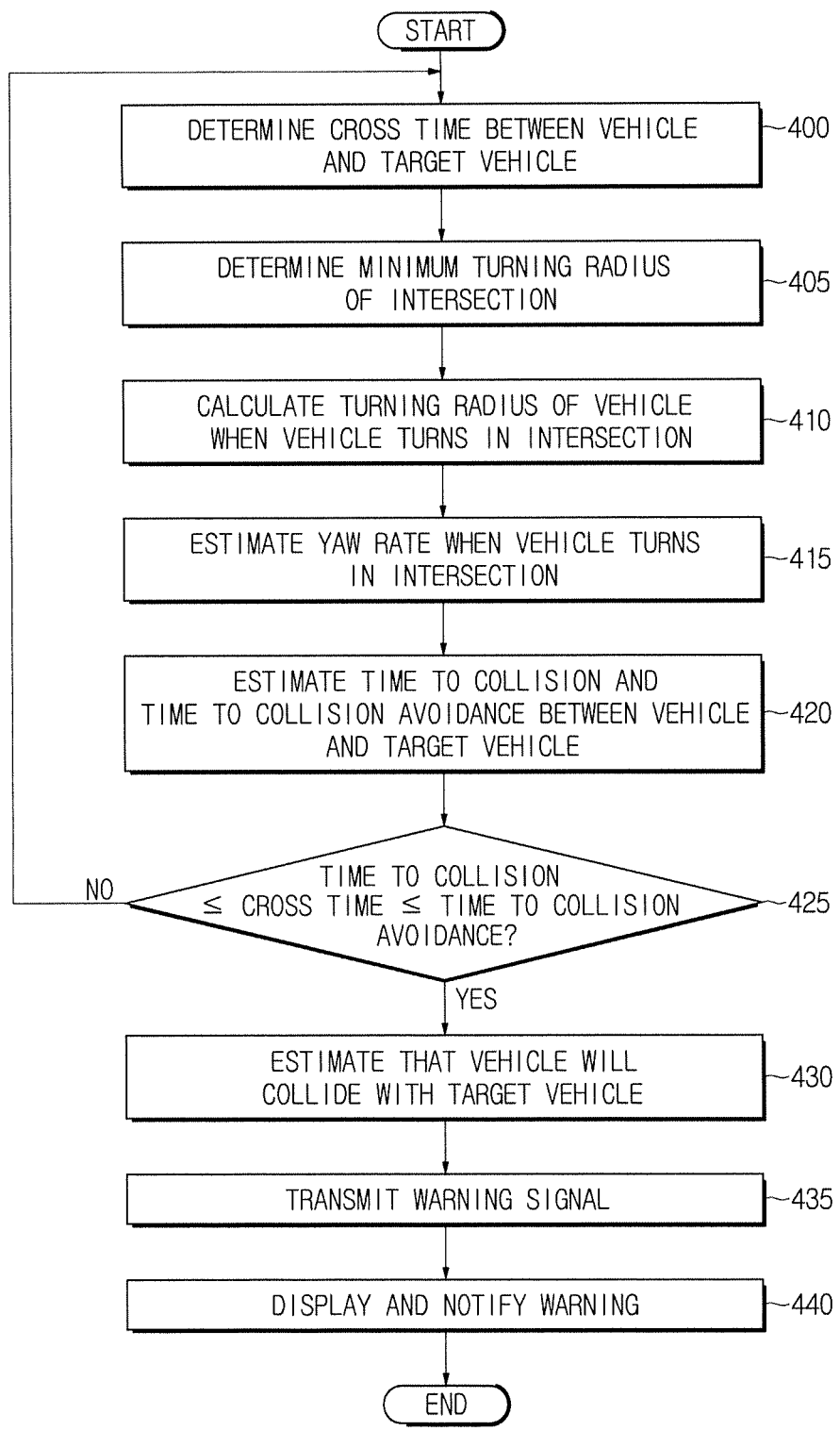
FIG. 13 is a flowchart illustrating a method for controlling the vehicle according to an embodiment of the present disclosure.

FIG. 13 is a flowchart illustrating a method for controlling the vehicle according to an embodiment of the present disclosure.

Referring to FIG. 13, the sensor 200 may detect the target vehicle 2, which is driving in the intersection, before the vehicle 1 enters the intersection during the vehicle 1 drives. The sensor 200 may determine the relative speed between the vehicle 1 and the target vehicle 2 by detecting the driving speed of the target vehicle 2 during driving, and determine the cross time ($t_1$) when the vehicle 1 crosses the target vehicle 2, based on the determined relative speed and a distance between the vehicle 1 and the target vehicle 2 (400).

The controller 100 may determine the minimum turning radius ($R_{min}$) of the intersection based one at least one of the road map information, the navigation information and the lane recognition information of the road, which are stored in the memory 90 (405) and may calculate the actual turning radius (R) in the state in which the vehicle 1 turns in the intersection, based on data about the determined minimum turning radius ($R_{min}$), as illustrated in FIGS. 5 to 8 (410).

The controller 100 may estimate the yaw rate ($\gamma$) in the state in which the vehicle 1 turns in the intersection, based on the driving speed of the vehicle 1 and the calculated turning radius (R) (415). A description about estimating the yaw rate has been described in FIGS. 5 to 8, and a duplicate description will be omitted.

The controller 100 may estimate the time to collision (TTCY) and the time to collision avoidance (TTCAY) between the vehicle 1 and the target vehicle 2 (420).

That is, the controller 100 may estimate the time to collision avoidance (TTCAY) for avoiding the collision between the vehicle 1 and the target vehicle 2, based on the collision avoidance distance ($y_{ca}$) allowing the vehicle 1 to pass cross the target vehicle 2 without colliding with the target vehicle 2 in the horizontal direction when the vehicle 1 enters and turns in the intersection. The controller 100 may estimate the time to collision (TTCY) that is taken for the vehicle 1 to drive until just before the vehicle 1 collides with the target vehicle 2, based on the collision distance ($y_c$) that is a driving distance until just before the vehicle 1 passes the target vehicle 2 in the horizontal direction, when the vehicle 1 enters and turns in the intersection.

The controller 100 may determine whether the cross time ($t_1$) is in a range of the time to collision avoidance (TTCAY) and the time to collision (TTCY) (425). When the cross time (t1) is equal to or more than the estimated time to collision (TTCY) and equal to or less than the estimated time to collision avoidance (TTCAY), the controller 100 may estimate that the vehicle 1 will collide with the target vehicle 2 or otherwise, the controller 100 may estimate that the vehicle 1 will not collide with the target vehicle 2.

The controller 100 may transmit the control signal warning a driver when it is estimated that the vehicle 1 will collide with the target vehicle 2 in the state in which the vehicle 1 enters and turns in the intersection (435), and the display 303 may display a warning text indicating that the vehicle 1 may collide with the target vehicle 2, based on the control signal transmitted by the controller 100 (440). The driver may recognize the risk of collision with the target vehicle 2 in the state in which the vehicle 1 enters and turns in the intersection, through the warning text displayed on the display 303 and the instrument panel 330.

The disclosed embodiments may be implemented in the form of a recording medium that stores instructions executable by a computer. The instructions may be stored in the form of program code and may perform the operations of the embodiments disclosed by creating a program module when executed by a processor. The recording medium may be implemented in a computer-readable recording medium.

The computer readable recording medium may include various kinds of recording medium in which an instruction decrypted by the computer system is stored. For example, the computer readable recording medium may include a read only memory (ROM), a random access memory (RAM), a magnetic tape, a magnetic disk, a flash memory, and an optical data storage device.

As is apparent from the above description, according to the proposed vehicle and method for controlling thereof, it may be possible to determine the risk of collision with the counter vehicle in advance, before the vehicle enters the intersection, and warn the driver the risk of collision, thereby improving the convenience of the driver and thereby securing the safety by preventing the collision with another vehicle.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle turning in an intersection, the vehicle comprising:
   a speed detector configured to detect a driving speed of the vehicle;
   a sensor configured to determine a cross time between the vehicle and a target vehicle driving in the intersection; and
   a controller configured to calculate a turning radius of the vehicle in the intersection, based on a minimum turning radius of the intersection, configured to estimate a time to collision between the vehicle turning in the intersection and the target vehicle and a time to collision avoidance allowing the vehicle to pass cross the target vehicle without colliding with the target vehicle, based on the driving speed of the vehicle and the calculated turning radius, and configured to transmit a warning signal by estimating that the vehicle collides with the target vehicle when the determined cross time is equal to or more than the estimated time to collision and equal to or less than the estimated time to collision avoidance.

2. The vehicle of claim 1, wherein
the controller estimates a yaw rate in a state in which the vehicle turns in the intersection, based on the driving speed of the vehicle and the calculated turning radius.

3. The vehicle of claim 2, wherein
the controller estimates the time to collision and the time to collision avoidance based on the estimated yaw rate.

4. The vehicle of claim 1, wherein
when the vehicle turns in the intersection, the controller estimates the time to collision based on a driving distance in which the vehicle drives before crossing the target vehicle in a horizontal direction.

5. The vehicle of claim 1, wherein
when the vehicle turns in the intersection, the controller estimates the time to collision avoidance based on a driving distance in which the vehicle passes cross the target vehicle in the horizontal direction.

6. The vehicle of claim 1, wherein
the controller estimates the time to collision avoidance based on a driving speed of the target vehicle detected by the sensor.

7. The vehicle of claim 1, wherein
the sensor determines a relative speed between the vehicle and the target vehicle by detecting the driving speed of the target vehicle, and determines the cross time based on the determined relative speed and a relative distance between the vehicle and the target vehicle.

8. The vehicle of claim 1, wherein
the controller determines the minimum turning radius of the intersection based on at least one of map information, navigation information, and lane recognition information of the intersection.

9. The vehicle of claim 1, wherein
the controller calculates the turning radius of the vehicle in the intersection based on at least one of the minimum turning radius, information about a lane on which the vehicle drives, and information about a lane on which the target vehicle drives.

10. The vehicle of claim 1, further comprising:
a display configured to display whether the vehicle collides with the target vehicle or not, based on the transmitted warning signal.

11. A method for controlling a vehicle turning in an intersection, comprising steps of:
   determining, by a sensor, a cross time of the vehicle and a target vehicle driving in the intersection;
   calculating, by a controller, a turning radius of the vehicle in the intersection, based on a minimum turning radius of the intersection;
   estimating, by the controller, a time to collision between the vehicle turning in the intersection and the target vehicle and a time to collision avoidance allowing the vehicle to pass cross the target vehicle without colliding with the target vehicle, based on a driving speed of the vehicle and the calculated turning radius;
   estimating, by the controller, that the vehicle collides with the target vehicle when the determined cross time is equal to or more than the estimated time to collision and equal to or less than the estimated time to collision avoidance; and
   transmitting, by the controller, a warning signal based on a result of the estimation.

12. The method of claim 11, further comprising a step of:
estimating a yaw rate in a state in which the vehicle turns in the intersection, based on the driving speed of the vehicle, and the calculated turning radius.

13. The method of claim 12, wherein
the step of estimating the time to collision and the time to collision avoidance comprises estimating the time to collision and the time to collision avoidance based on the estimated yaw rate.

14. The method of claim 11, wherein
the step of estimating the time to collision comprises estimating the time to collision based on a driving distance in which the vehicle drives before crossing the target vehicle in a horizontal direction, when the vehicle turns in the intersection.

15. The method of claim 11, wherein
the step of estimating the time to collision avoidance comprises estimating the time to collision avoidance based on a driving distance in which the vehicle passes cross the target vehicle in the horizontal direction, when the vehicle turns in the intersection.

16. The method of claim 11, wherein
the step of estimating the time to collision avoidance comprises estimating the time to collision avoidance based on a driving speed of the target vehicle.

17. The method of claim 11, wherein
the step of determining the cross time comprises determining a relative speed between the target vehicle and the vehicle and determining the cross time based on the determined relative speed and a relative distance between the vehicle and the target vehicle.

18. The method of claim 11, further comprising a step of:
determining the minimum turning radius of the intersection based on at least one of map information, navigation information, and lane recognition information of the intersection.

19. The method of claim 11, wherein
the step of calculating the turning radius of the vehicle in the intersection comprises calculating the turning radius of the vehicle in the intersection, based on at least one of the minimum turning radius, information about a lane on which the vehicle drives, and information about a lane on which the target vehicle drives.

20. The method of claim 11, further comprising:
displaying whether the vehicle collides with the target vehicle or not, based on the transmitted warning signal.

* * * * *